United States Patent [19]
Franke

[11] 3,782,146
[45] Jan. 1, 1974

[54] LOCKING DEVICE

[76] Inventor: Ronald E. Franke, 7617-30th Ave., Kenosha, Wis. 53140

[22] Filed: Oct. 8, 1971

[21] Appl. No.: 187,680

[52] U.S. Cl.................... 70/232, 70/166, 166/85, 292/251
[51] Int. Cl........................................... F16b 41/00
[58] Field of Search.................. 70/163, 164, 166, 70/167, 229, 231, 232; 138/89, 96; 220/42 A, 55 J, 3.8; 166/75, 85; 292/251

[56] References Cited
UNITED STATES PATENTS

| 2,345,949 | 4/1944 | Robbins | 70/232 |
| 3,540,245 | 11/1970 | Pope | 70/231 |
| 3,637,180 | 1/1972 | Parry | 248/203 |
| 2,316,695 | 4/1943 | Jaffa | 85/32 K |
| 1,778,502 | 10/1930 | Levey | 70/164 X |
| 3,181,523 | 5/1965 | Casey | 123/198 DC |
| 1,774,141 | 8/1930 | Hills | 292/301 |
| 3,136,362 | 6/1964 | Baker | 166/85 |
| 3,250,559 | 5/1966 | Sommerfeld | 292/251 |
| 3,467,181 | 9/1969 | Maass | 166/85 |

Primary Examiner—Albert G. Craig, Jr.
Attorney—Neil E. Hamilton et al.

[57] ABSTRACT

A locking device which provides a means of securing two elements together in a tamperproof manner and is especially adaptable to securing a cap member on a pipe such as a cap on a well casing. A bolt is used to engage a base member through an outer member which is secured on the base with a cover member rotatably held around the head of the bolt to prevent its disengagement and affording a variety of locking methods for securing the bolt in a tamperproof manner.

6 Claims, 7 Drawing Figures

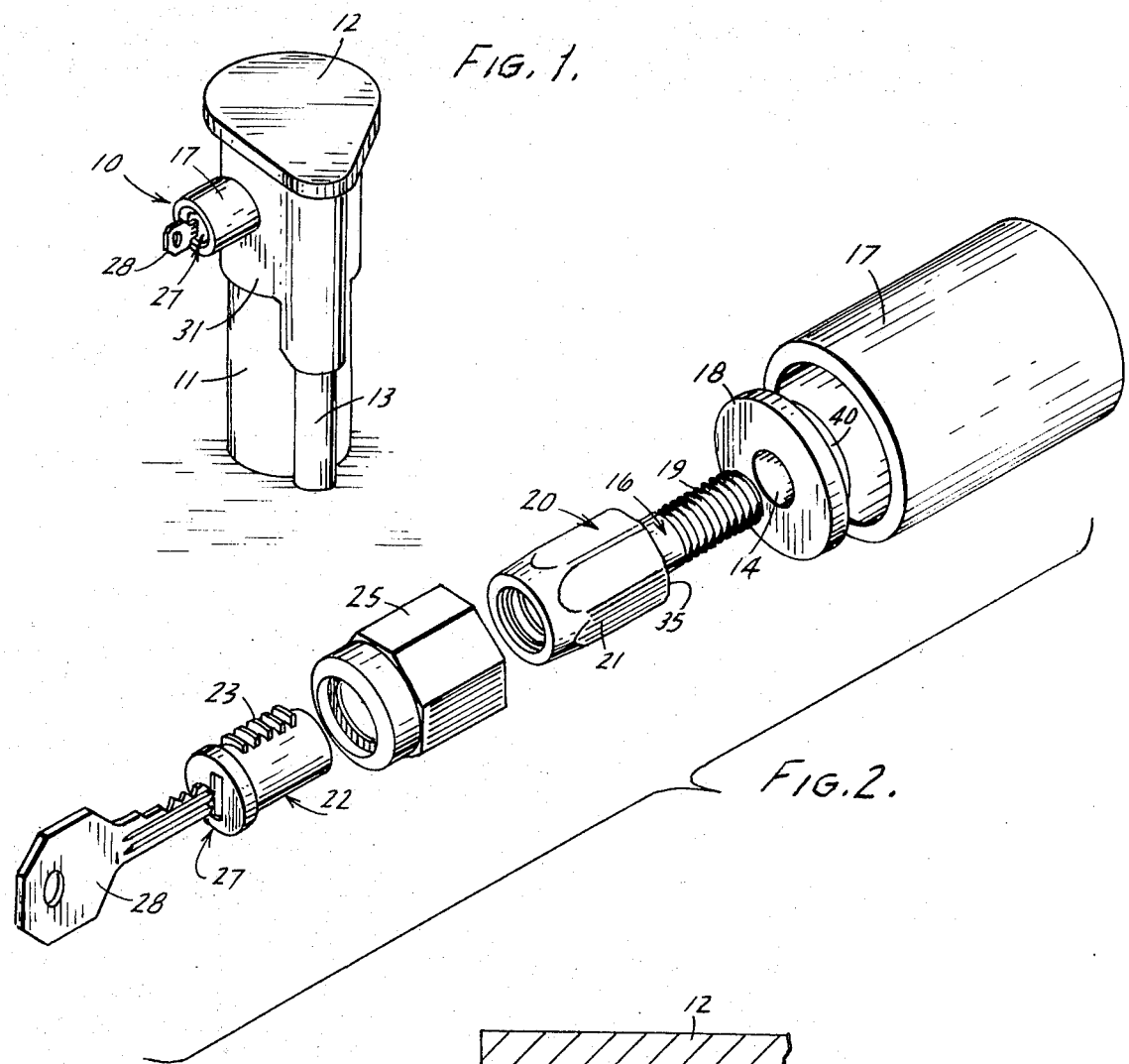
Fig. 1.
Fig. 2.
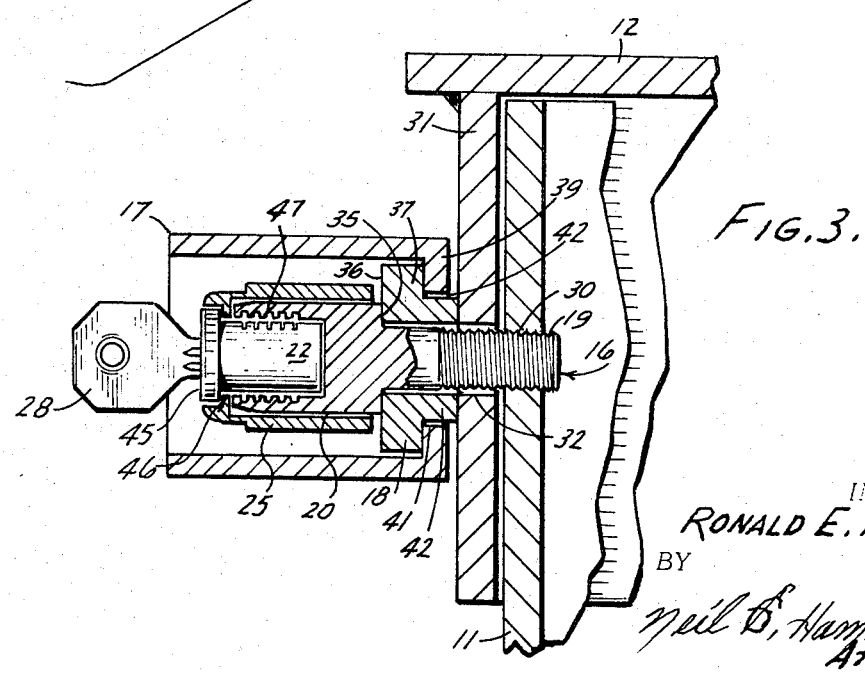
Fig. 3.
INVENTOR.
RONALD E. FRANKE
BY
Neil B. Hamilton
ATTORNEY.

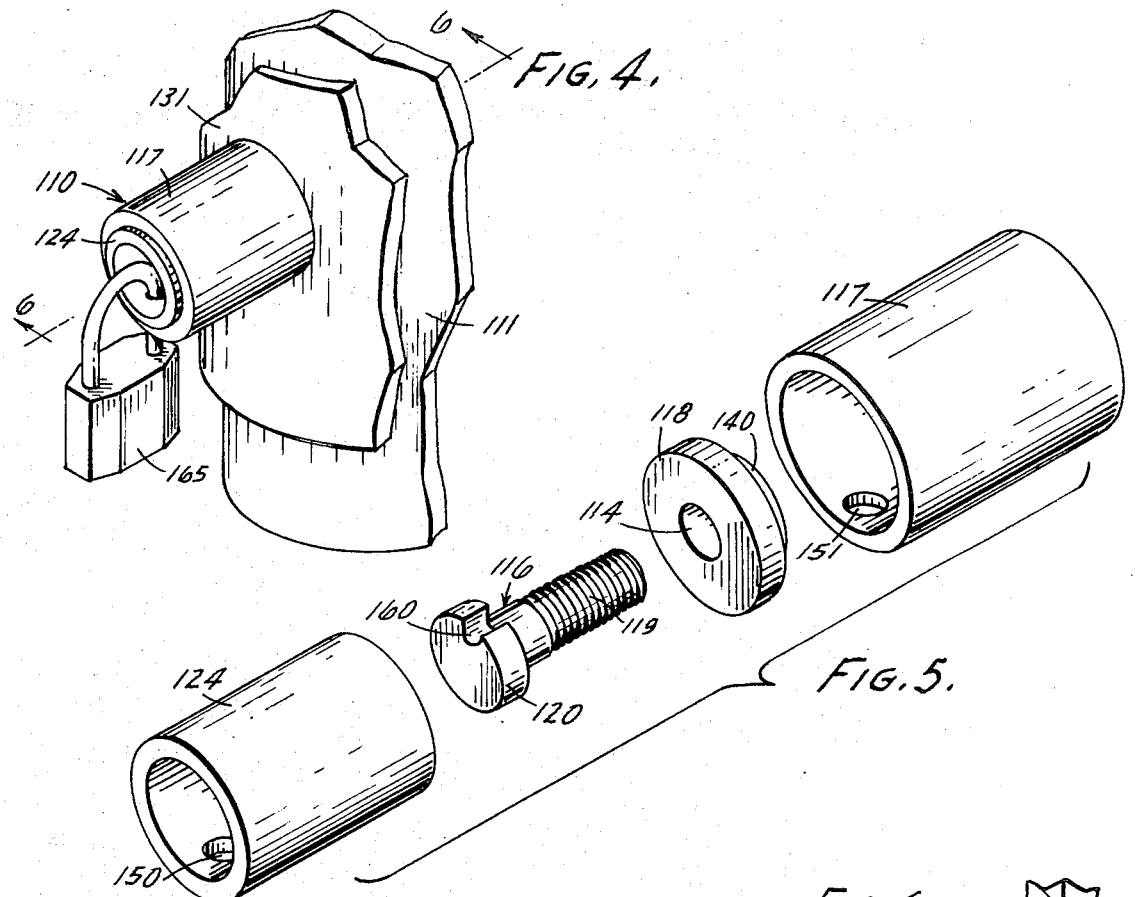
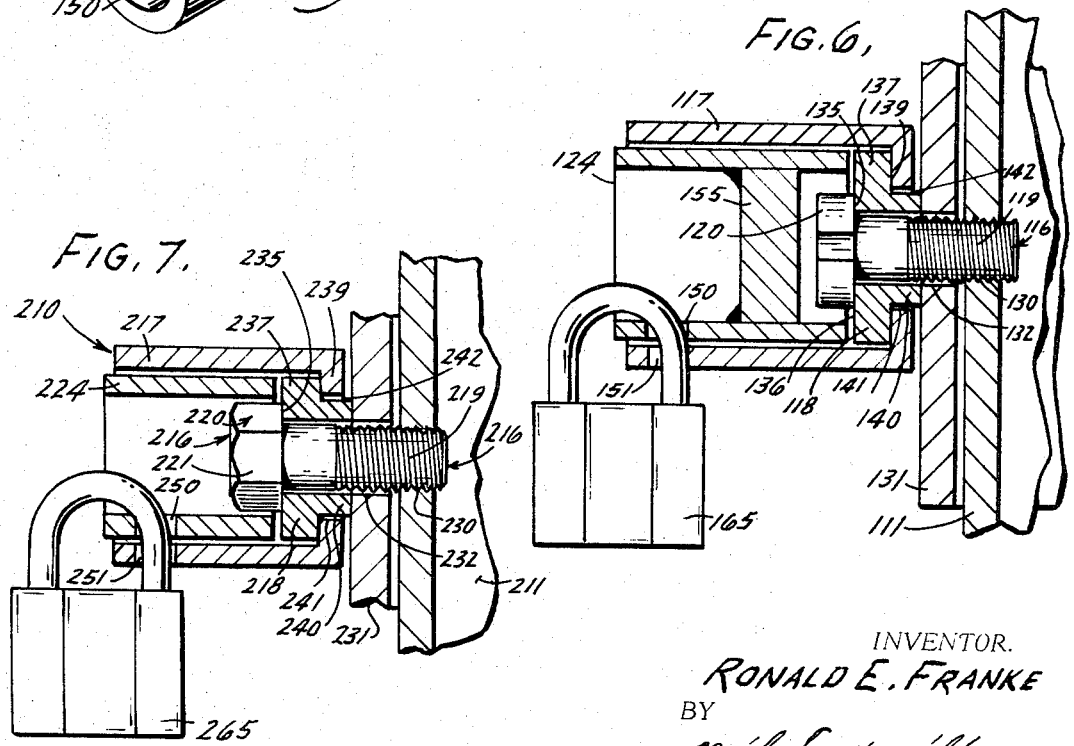

LOCKING DEVICE

BACKGROUND OF THE INVENTION

This invention relates to a tamperproof locking device for securing one member to another and in particular, for securing a cap on a well casing. More particularly, this invention relates to a threaded bolt securing means wherein the bolt member is shielded by an outer cover which is rotatably carried by the bolt with the cover member providing an obstruction to easy access of the head of the bolt in one instance and providing a locking means and a shielding or false wall.

Locking devices of the type concerned with in this invention are described in U.S. Pat. Nos. 1,791,277; 3,537,283; 3,149,782 and 3,450,148. U.S. Pat. No. 1,791,277 illustrates a multi-cap member for pipes which is retained on the end of a pipe by means of a padlock. U.S. Pat. No. 3,149,782 shows an attachment for controls to a tank wherein a pivotal type lever is actuated by a screw to engage a shoulder section on the pipe. In U.S. 3,450,148 a lock bolt means is disclosed for insertion through the wall of a fire hydrant and through the inner valve as well as an outer cap. A lock type filler cap having an inner threaded member and an outer cap member is shown in U.S. Pat. No. 3,537,283. The prior art nowhere teaches a simplified locking device which incorporates a central threaded bolt and is encompassed by a cover member which houses the head of the bolt in a concealed manner. Neither does the prior art illustrate a locking engagement with an outer cover member surrounding the bolt and in a manner to prevent easy access to the lateral surfaces of the head of the bolt. Nowhere is there commercially available a key type locking mechanism inside the confines of the cover housing to afford protection from the elements, and non-removal of the bolt. Neither is there available a locking device which employs a minimum number of parts and yet can be fabricated without special need of tooling and at the same time can be composed of parts readily available on the open market.

It is an object of the present invention to provide a novel locking mechanism which affords rigid and secure fastening. It is another object of this invention to provide a locking device which employs a minimum number of parts and can be formed from readily available components. It is still another object of this invention to provide a locking device which is readily adaptable to several types of external locking situations. It is yet another object of this invention to provide a locking mechanism for a well casing cap wherein an outer shield provides protection against tampering as well as from the elements of the inner bolt member and in some instances affords a false impression as to the type of internal lock.

SUMMARY OF THE INVENTION

The foregoing objects are accomplished and the shortcomings of the prior art are overcome by the present locking device which is comprised of an inner threaded bolt member which is threadably fastened on an element to which an item is desired to be secured. A cover member rotatably surrounds the head of the inner bolt with an end shoulder providing an obstruction if an attempt is made to remove the cover member and an opening adjacent to the shoulder to accommodate a portion of threaded bolt. An annular insert is provided to secure the threaded bolt inside the cover member in a rotatable manner. In one instance an available locking type device for locking lugs on vehicle wheels is utilized and in another instance an inner element is inserted inside the cover member to afford a locking arrangement such as by a padlock between the inner member and the cover member and still in a third instance a wall or false locking means is secured inside the inner insertable member, accommodated within the cover member.

BRIEF DESCRIPTION OF THE DRAWINGS

A better understanding of the present locking device will be accomplished by reference to the drawing wherein:

FIG. 1 is a perspective view of one embodiment of the locking device illustrated in conjunction with a well casing cap.

FIG. 2 is an exploded view of the locking device shown in FIG. 1.

FIG. 3 is a view in vertical section taken through line 3—3 of FIG. 1.

FIG. 4 is a partial view in perspective illustrating an alternative embodiment of the invention.

FIG. 5 is an exploded view of the locking device shown in FIG. 4.

FIG. 6 is a view in vertical section taken along line 6—6 of FIG. 4.

FIG. 7 is a view in vertical section of still another embodiment of this invention.

DESCRIPTION OF THE PREFERRED EMBODIMENT

Proceeding to a detailed description of a preferred embodiment of the present invention, the locking device generally 10 is shown for use in conjunction with an inner second member as represented by a well casing 11 and a first outer cap member represented by a well casing cap 12. The numeral 13 illustrates an exterior conduit for wiring to a well pump. As shown specifically in FIG. 2, an inner threaded bolt element 16 is designed to fit within the confines of an annular cover member 17 which also accommodates an annular insert member 18 and through which a threaded portion 19 of bolt 16 fits. The head 20 of bolt 16 has the usual hexagon contact surfaces such as shown at 21 for engagement with a wrench. Head 20 is hollow and accommodates a spring loaded plug 22 with teeth 23. The purpose of plug 22 is to hold the outer collar member 25 in a rotatable manner over head 20. The particular retention and moveable features of the components 20, 22, 23, 25 and 28 of this particular locking mechanism 27 will be better explained with reference to FIG. 3. A key 28 is insertable in plug 22 and plug 22 is so designed so that when the key is inserted the teeth 23 are retracted into the body of plug 22. This specific locking mechanism 27 is of a typical design for locking wheel members on stud bolts of cars and manufactured by Hurd Lock Manufacturing Division of Avis Industrial Corporation, 605 Bohannan Avenue, Greenville, Tenn., 37743.

Referring specifically to FIG. 3, well casing wall 11 is internally threaded such as 30 to accommodate the external threads 19 of bolt 16. It will be noted that cap 12 has a lateral wall 31 with an opening at 32 to accommodate the threaded portion 19 of bolt 16 in an unthreaded manner. Bolt head 20 is snuggly held against annular insert 18 by engagement with shoulder portion 35 on head 20 for engagement against the adjacent outer surface 36 of annular insert 18. In turn, annular insert 18 has a shoulder portion 37 for engagement against a shoulder section 39 of annular cover 17. It will be noted that annular insert 18 has a projecting section 40 which extends through opening 41 in annular member 17. A clearance 42 is provided between the outer surface of the projecting member and the adjacent shoulder 39 of annular member 17. The purpose of this is to provide a free rotation of the cover over the insert and will be better described in the operation of this embodiment.

DESCRIPTION OF THE ALTERNATIVE EMBODIMENTS

Referring to the alternative embodiments disclosed in FIGS. 4–7 similar numbers are employed to designate similar parts. In the embodiment disclosed in FIGS. 4–6, numbers in the "100" series are utilized whereas in the embodment illustrated in FIG. 7 the "200" series is used.

Turning to the embodiment shown in FIGS. 4–6, it will be seen that the usual threaded bolt 116 is securely and threadably held in wall 111 by internal threads 130. Bolt 116 passes through opening 132 in a first exterior wall 131 and securely holds insert 118 against wall 131 by engagement between the shoulder portion 135 on head 120 and against the adjacent outer surface 136 of annular insert 118. An opening 141 between the outer surface of the projecting section 140 of insert 118 and the adjacent shoulder 139 of annular member 17 is provided. The major difference between the embodiment shown in FIGS. 4–6 and that previously described in FIGS. 1–3 is in the means of locking and securing bolt 116 in annular cover member 117. In place of the locking mechanism 27 there is instead an inner annular walled member 124 which is accommodated within outer annular member 117 and has an opening 150 for orientation with opening 151 in annular cover 117 when inner member 124 is placed in cover 117 as shown in FIG. 6. Contained within inner annular member 124 is a wall member 155 the purpose of which is to hide bolt head 120. If desired, wall member 155 could be a bolt head with an end bolt portion extending through it to give the impression that this is the locking mechanism and have a weldment or damaged threads in the bolt to give the impression of it being removable only with cuttings tools.

Turning to the embodiment shown in FIG. 7, it will be noted that this embodiment is quite similar to that described for the embodiment shown in FIGS. 4–6 except that this embodiment does not have the wall 155 but instead relies upon a close tolerance between the inner annular member 224 and the head 220 of bolt 216. It will be noted that another difference between these embodiments is that a hexagon type head 220 is provided in the embodiment of FIG. 7 whereas a rounded head with a slot 160 is provided for the bolt 116 in the embodiment of FIGS. 4–6. In both embodiments, a padlock of the normal type 165 and 265 are provided as the locking device for the embodiments of FIGS. 4–6 and FIG. 7, respectively.

OPERATION

A better understanding of the advantages of the locking devices 10, 110 and 210 will be had by a description of their operation. Taking locking device 10 first, it will be assembled and secured to wall 11 in the manner basically described in FIG. 2. Annular insert 18 will be placed inside outer cover member 17 and bolt 16 inserted through opening 14. Threaded portion 19 will be then placed through opening 32 in wall 31 and threads 19 engaged with threads 30 in wall 11 and turned until shoulder 35 engages insert 18 to secure projecting section 40 against the outer wall surface of wall 31. With the secure engagement accomplished, outer collar 25 will be slipped over head 20 and plug 22 inserted in hollow head 20 by means of key 28. Upon release of the key, teeth 23 will project to engage accommodating slots 47 inside head 20. To remove locking device and consequently the outer cap 12, the reverse procedure is effected.

Concerning the operation of the alternative embodiments shown in FIGS. 4–7, the fastening of bolt 116 and 216 will be as similarly described for bolt 16 in that they will be inserted through the openings such as 114 in insert 118 through walls 131 and 231 and into walls 111 and 211. In the instance of the embodiment shown in FIGS. 4–6, after the bolt 116 is securely fastened by abutment against insert 118 and with its subsequent abutment against wall 131, the annular inner member 124 is positioned inside outer cover 117 until the holes 150 and 151 are orientated. In this position the padlock 165 is inserted through the openings 150 and 151. Anyone attempting to remove the outer cap as represented by wall 131 would first have to remove the padlock and upon first seeing wall 155 would still not be certain that upon its removal easy access would be obtained. This is especially true if the wall 155 is in the form of a predamaged nut with a bolt inserted.

The operation of the embodiment shown in FIG. 7 is the same as for the one shown in FIGS. 4–6 except that no wall member is placed inside inner member 224. Even without the wall member it is extremely difficult to apply a wrench or any other means of turning head 220 of bolt 216 as a small clearance is afforded between inner wall 245 of inner member 224 and the surfaces 221 of head 220.

An important feature in all of the embodiments is the aspect that the inserts 18, 118 and 218 all provide for free rotation of the outer annular members 17, 117 and 217. This is afforded by the spacing 42, 142 and 242 between the projecting sections 40, 140 and 240 of the respective inserts and the openings as represented by 41, 141 and 241 in the respective cover members between the shoulders 39, 139 and 239 respectively. Thus, any attempt to remove bolts 16, 116 and 216 by turning the outer cover members 17, 117 and 217 is obviated by the rotation and the obstruction between the shoulders 39, 139 and 239 on the respective covers, shoulders 37, 137 and 237 on the respective inserts and bolt heads 20, 120 and 220 respectively. If desired, the projecting sections 40, 140 and 240 could be made separately from the shoulder sections 37, 137 and 237, respectively, with the same effect.

All of the parts employed in composing the locking devices and the various embodiments are readily available on the market and are made of steel. If desired, and while not as sturdy a structure, they may be fabricated from aluminum or rigid plastic such as nylon.

It will thus be seen that through the present invention there is now provided a locking device for securing any type of outer member to an inner member which is easily fabricated from a minimum number of parts and yet provides a substantially foolproof locking mechanism. The locking mechamisms are inexpensive to fabricate and are easily adapted to well casings and caps that are already in use. No special tools are required to employ the locking device and it can be employed in a wide variety of locking situations especially out of doors as the outer members such as 17, 117 and 217 afford a substantially protective shelter for the inside engaging and locking mechanism.

The foregoing invention can be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A device for locking a first member to a second member, said first member having an opening therein, comprising: a threaded securing member provided with a lateral surface and carried by said second member, said threaded securing member adapted to extend through the opening in said first member; a cover member having an end shoulder section with an opening to accommodate a portion of said threaded securing member and spaced from the lateral surface of said securing member to provide an obstruction with and prevent access to the lateral surface of said securing member; an insert member constructed and arranged to fit within the confines of said cover and against said shoulder to provide contact with the lateral surface of said securing member, said insert member provided with a central opening and a projecting section for extending through the opening in said shoulder section in said cover member to accommodate and retain said cover member in a rotatable manner surrounding said securing member; and a key control locking means including a sleeve rotatably carried by said securing member and surrounding the portion outwardly of said lateral surface to secure said securing member within said cover member.

2. The device as defined in claim 1 wherein said cover member is annular in configuration.

3. The device as defined in claim 1 wherein said locking means to secure said securing member in said cover member further includes a plug portion having teeth members actuated by said key.

4. A device for locking a first member to a second member, said first member having an opening therein, comprising: a threaded securing member provided with a lateral surface and carried by said second member, said threaded securing member adapted to extend through the opening in said first member; a cover member having an end shoulder section with an opening to accommodate a portion of said threaded securing member and spaced from the lateral surface of said securing member to provide an obstruction with said securing member; an insert member constructed and arranged to fit within the confines of said cover and against said shoulder to provide contact with the lateral surface of said securing member, said insert member provided with a central opening and a projecting section for extending through the opening in said shoulder section in said cover member to accommodate and retain said cover member in a rotatable manner; and locking means including an inner walled member adapted to be accommodated within the confines of said cover member and orientated openings in said cover member and said inner walled member to accommodate a locking device.

5. The device as defined in claim 4 wherein said threaded securing member is a bolt member and said locking device is a padlock.

6. The device as defined in claim 4 wherein said threaded element is a bolt member having a head threadably carried by an internally threaded well casing, and further includes a wall member positioned in said inner walled member and outward of said head of said bolt member.

* * * * *